United States Patent
Tokumoto (10) Patent No.: US 9,200,681 B2
(45) Date of Patent: Dec. 1, 2015

(54) CLUTCH AND STRADDLE-TYPE VEHICLE WITH THE SAME

(71) Applicant: YAMAHA HATSUDOKI KABUSHIKI KAISHA, Iwata-shi, Shizuoka (JP)

(72) Inventor: Hiroyuki Tokumoto, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/292,991

(22) Filed: Jun. 2, 2014

(65) Prior Publication Data

US 2014/0353108 A1    Dec. 4, 2014

(30) Foreign Application Priority Data

Jun. 3, 2013   (JP) ................................ 2013-117200

(51) Int. Cl.
*F16D 13/54* (2006.01)
*F16D 13/56* (2006.01)

(52) U.S. Cl.
CPC .......... *F16D 13/56* (2013.01); *F16D 2013/565* (2013.01); *F16D 2300/22* (2013.01)

(58) Field of Classification Search
None
See application file for complete search history.

(56) References Cited

U.S. PATENT DOCUMENTS

| | | | | |
|---|---|---|---|---|
| 4,486,183 A | * | 12/1984 | Posiviata et al. | ................ 474/94 |
| 5,617,938 A | * | 4/1997 | Tsukada et al. | .............. 192/54.5 |
| 2009/0071792 A1 | | 3/2009 | Kataoka et al. | |
| 2009/0078526 A1 | * | 3/2009 | Kawatsu et al. | ........... 192/70.23 |
| 2011/0061985 A1 | * | 3/2011 | Nakamura et al. | ......... 192/70.23 |

FOREIGN PATENT DOCUMENTS

| JP | 7-38797 U | 7/1995 |
|---|---|---|
| JP | 2009-068578 A | 4/2009 |
| JP | 2010-038182 A | 2/2010 |

OTHER PUBLICATIONS

Partial English translation of Official Communication issued in Japanese Patent Application No. 2013-117200 dated Feb. 25, 2014.

* cited by examiner

*Primary Examiner* — Rodney H Bonck
(74) *Attorney, Agent, or Firm* — Keating and Bennett, LLP (57) ABSTRACT

A friction clutch includes a clutch boss and a pressure member that change in a relative position in a rotation direction. The clutch boss and the pressure member respectively include cam surfaces that come into contact with each other when the relative position of the clutch boss and the pressure member changes. A first damper member configured to damp a collision between the cam surfaces is provided in the friction clutch. Generation of noise due to the collision between the cam surfaces when the relative position of the clutch boss and the pressure member rapidly changes in the rotation direction is significantly reduced or prevented.

9 Claims, 4 Drawing Sheets

CLUTCH AND STRADDLE-TYPE VEHICLE WITH THE SAME

CROSS-REFERENCE TO RELATED APPLICATION

The present application claims priority from Japanese application JP 2013-117200 filed on Jun. 3, 2013, the entire contents of which are hereby incorporated by reference into this application.

BACKGROUND OF THE INVENTION

1. Field of the Invention

The present invention relates to a friction clutch configured to change a degree of engagement in response to variations of input torque.

2. Description of the Related Art

A friction clutch generally includes a clutch housing, a friction plate integrally rotating with the clutch housing, and a clutch inner provided inside of the clutch housing. The clutch inner includes a clutch boss which integrally rotates with a rotation shaft, a pressure member, and a clutch spring that presses the pressure member toward the clutch boss. A clutch plate which integrally rotates with the clutch boss and the friction plate are provided between the clutch boss and the pressure member.

In a clutch disclosed in JP 2009-68578 A, a relative position of the clutch boss (referred as a clutch member in JP 2009-68578 A) and the pressure member is changeable in a rotation direction of the rotation shaft. The clutch boss and the pressure member respectively include cam surfaces that come into contact with each other such that a force in the axial direction is generated when their relative position changes in the rotation direction.

When torque input to the clutch increases and then the rotation speed of the clutch housing and the friction plate increases, the rotation speed of the pressure member becomes higher than that of the clutch boss since the clutch boss integrally rotates with the rotation shaft. As a result, the relative position of the clutch boss and the pressure member shifts in the rotation direction. The clutch boss and the pressure member disclosed in JP 2009-68578 A are provided with the cam surfaces which come into contact with each other when the rotation speed of the pressure member becomes higher than that of the clutch boss. The cam surfaces generate the force which presses the pressure member toward the clutch boss (that is, increases the pressure force of the clutch spring) and thus increase the degree of engagement of the clutch boss and the pressure member with the friction plate. Further, the clutch boss and the pressure member disclosed in JP 2009-68578 A are also provided with cam surfaces which come into contact with each other when the rotation speed of the clutch boss becomes higher than that of the pressure member. The cam surfaces generate a force which separates the pressure member from the clutch boss (that is, decreases the pressure force of the clutch spring) and thus decrease the degree of engagement of the clutch boss and the pressure member with the friction plate.

SUMMARY OF THE INVENTION

The inventor(s) of the present application discovered that, in the structure disclosed in JP 2009-68578 A, when the relative position of the pressure member and the clutch boss rapidly changes in the rotation direction, the cam surfaces collide with each other and generate noise.

Preferred embodiments of the present invention provide a clutch including a mechanism that increases a pressure force pressing one of two members sandwiching a friction plate toward the other or that decreases the pressure force, wherein the clutch significantly reduces or prevents noise due to a collision between cam surfaces even when a relative position of the two members rapidly changes in a rotation direction.

A friction clutch according to a preferred embodiment of the invention includes a first member and a second member opposed to each other in an axial direction of a rotation shaft, the first member and the second member configured to be relatively movable in the axial direction of the rotation shaft, and to change in a relative position in a rotation direction thereof; a friction plate provided between the first member and the second member and relatively rotatable with respect to the first member and the second member; a spring configured to press one member of the first member and the second member toward the other member in the axial direction of the rotation shaft to engage the first member and the second member with the friction plate; a first cam portion and a second cam portion provided on the first member and the second member, respectively, and configured to come into contact with each other such that a force in the axial direction of the rotation shaft is generated between the first member and the second member when the relative position of the first and second members in the rotation direction changes; and a damper member configured to damp a collision between the first cam portion and the second cam portion when the relative position of the first member and the second member changes in the rotation direction.

Further, another preferred embodiment of the present invention provides a straddle-type vehicle including the clutch described above.

According to the preferred embodiments of the present invention, the generation of noise is significantly reduced or prevented even when the relative position of the first member and the second member rapidly changes in the rotation direction.

The first cam portion and the second cam portion are preferably not in contact with each other until the damper member contracts by a predetermined dimension, and directly come into contact with each other when the damper member contracts by the predetermined dimension. Thus, the first cam portion and the second cam portion directly come into contact with each other and thus an excessive load is prevented from acting on the damper member. As a result, durability of the damper member is improved.

The damper member is preferably provided in a position different from positions of the first cam portion and the second cam portion. Thus, the first cam portion and the second cam portion directly come into contact with each other, and an excessive load is prevented from acting on the damper member and the durability of the damper member is improved.

The position of the damper member is preferably shifted in the axial direction from the positions of the first cam portion and the second cam portion. Thus, it is not necessary to increase the distance between the first cam portion and the second cam portion in the rotation direction in order to accommodate the damper member.

The first member preferably includes a cam portion projecting in the axial direction and includes the first cam portion therein, and the cam portion is preferably fitted in a hole provided in the damper member. Thus, the attachment stability of the damper member is improved.

The first cam portion and the second cam portion are preferably configured to generate a force which presses one member of the first member and the second member toward the other member in the axial direction of the rotation shaft when the first cam portion and the second cam portion come into contact with each other.

The clutch further preferably includes a third cam portion and a fourth cam portion which are provided on the first member and the second member, respectively, and which come into contact with each other such that a force is generated to separate one member of the first member and the second member from the other member when the relative position of the first member and the second member in the rotation direction changes; a first damper member provided as the damper member to damp the collision between the first cam portion and the second cam portion; and a second damper member to damp a collision between the third cam portion and the fourth cam portion.

Thus, the generation of noise is significantly reduced or minimized in both cases where the first member and the second member come closer to each other by the action of the first cam portion and the second cam portion and where the first member and the second member are separated from each other by the action of the third cam portion and the fourth cam portion.

A dimension of the second damper member in the rotation direction of the rotation shaft is preferably larger than a dimension of the first damper member in the rotation direction of the rotation shaft. Thus, the durability of the second damper member is improved.

A volume of the second damper member is preferably larger than a volume of the first damper member. Thus, the durability of the second damper member is improved.

The first damper member and the second damper member are preferably integral with each other. Thus, the number of parts in the clutch is reduced.

The first member preferably includes a cam portion projecting in the axial direction and includes the first cam portion therein, the second cam portion is preferably an inner surface of a hole provided in the second member in which the cam portion is fitted, and the damper member is preferably provided inside of the hole. Thus, attachment of the damper member is facilitated.

The hole provided in the second member preferably penetrates the second member in the axial direction, a third member is preferably arranged opposite to the first member and spaced apart from the second member and fixed to the first member, and the damper member is preferably positioned inside the hole of the second member and sandwiched between the first member and the third member in the axial direction of the rotation shaft. Thus, the attachment stability of the damper member is greatly improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
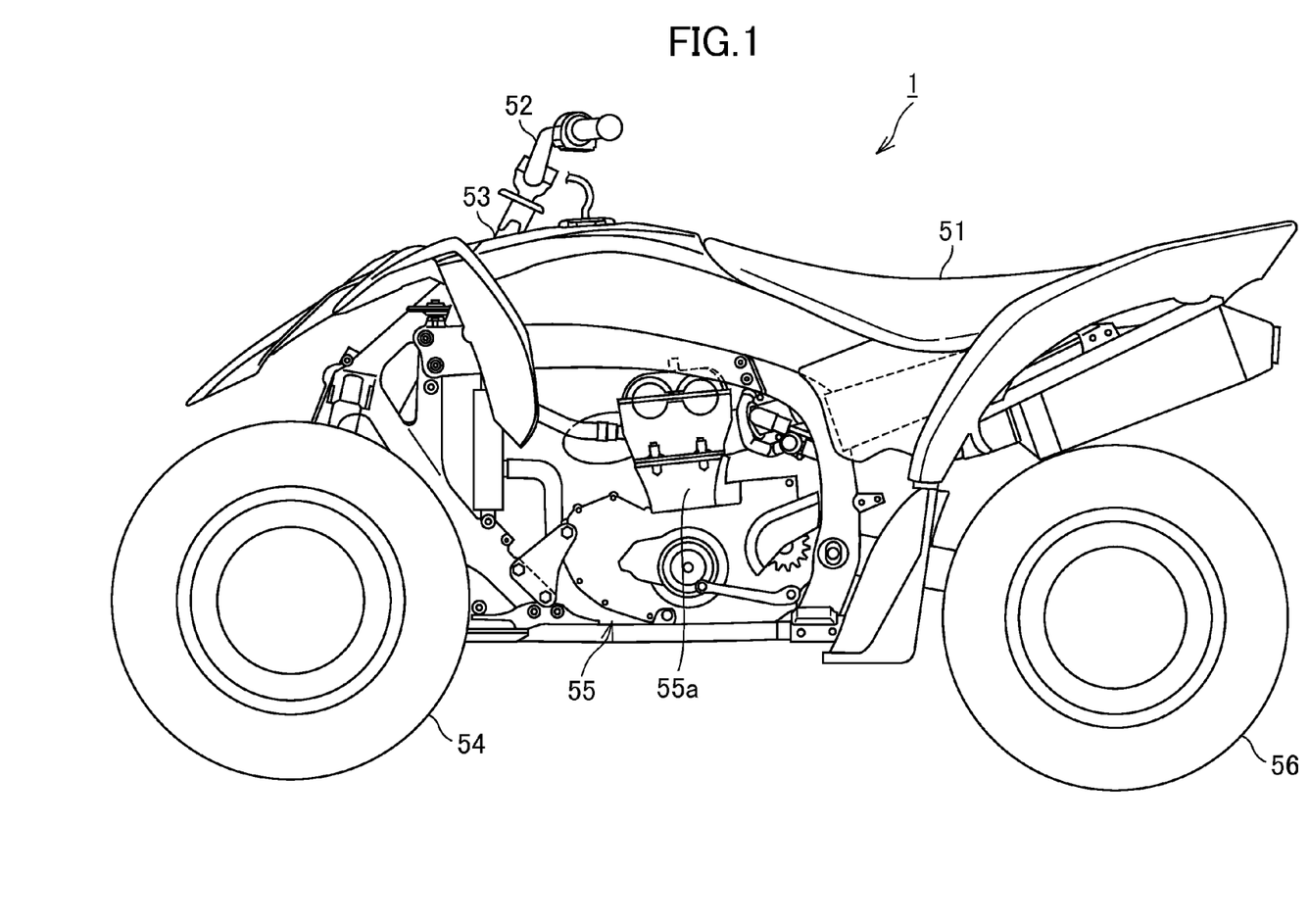
FIG. 1 is a side view of a straddle-type vehicle including a clutch according to a preferred embodiment of the present invention.
Figure 2:
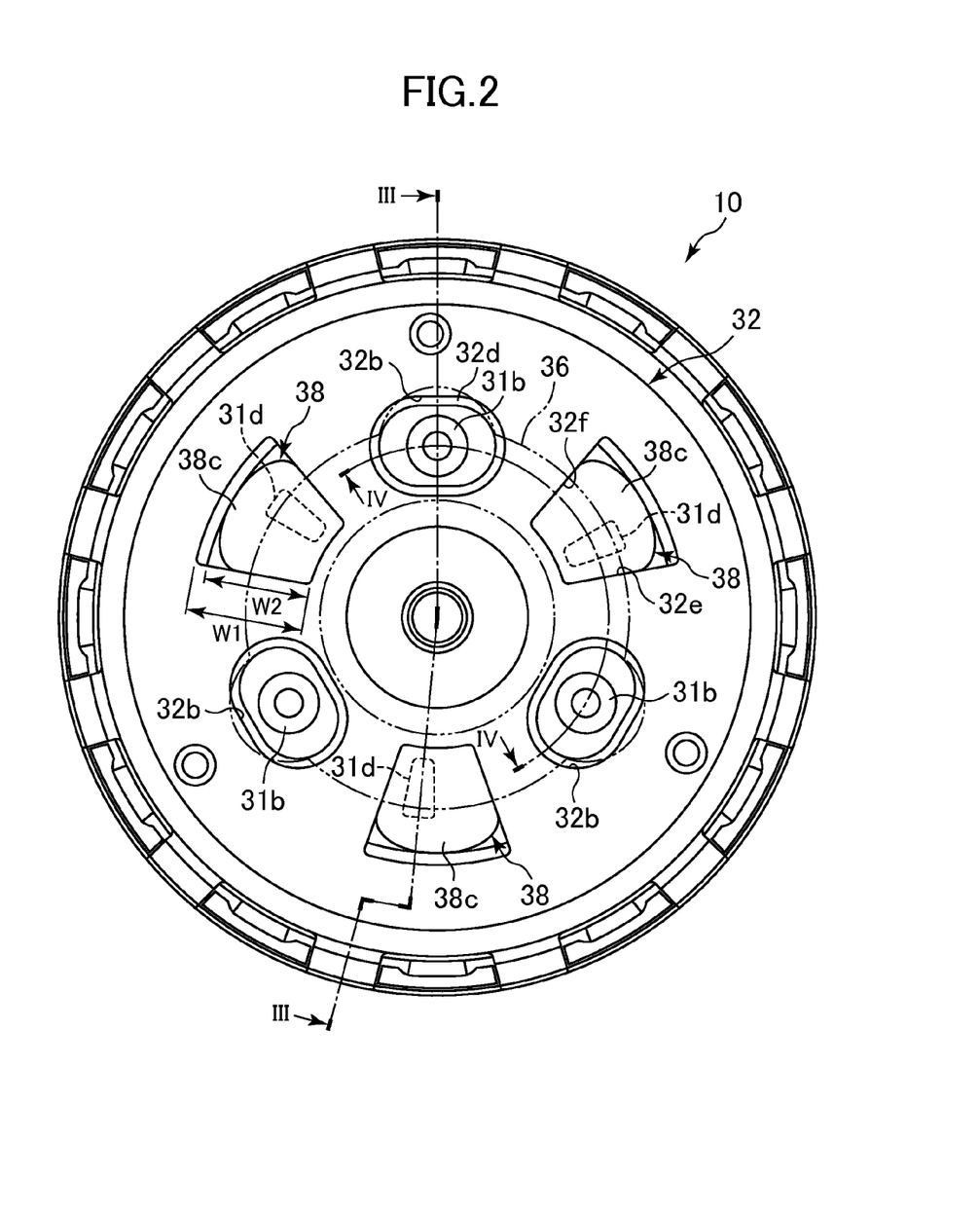
FIG. 2 is a side view of the clutch (a view of the clutch as seen in an axial direction).
Figure 3:
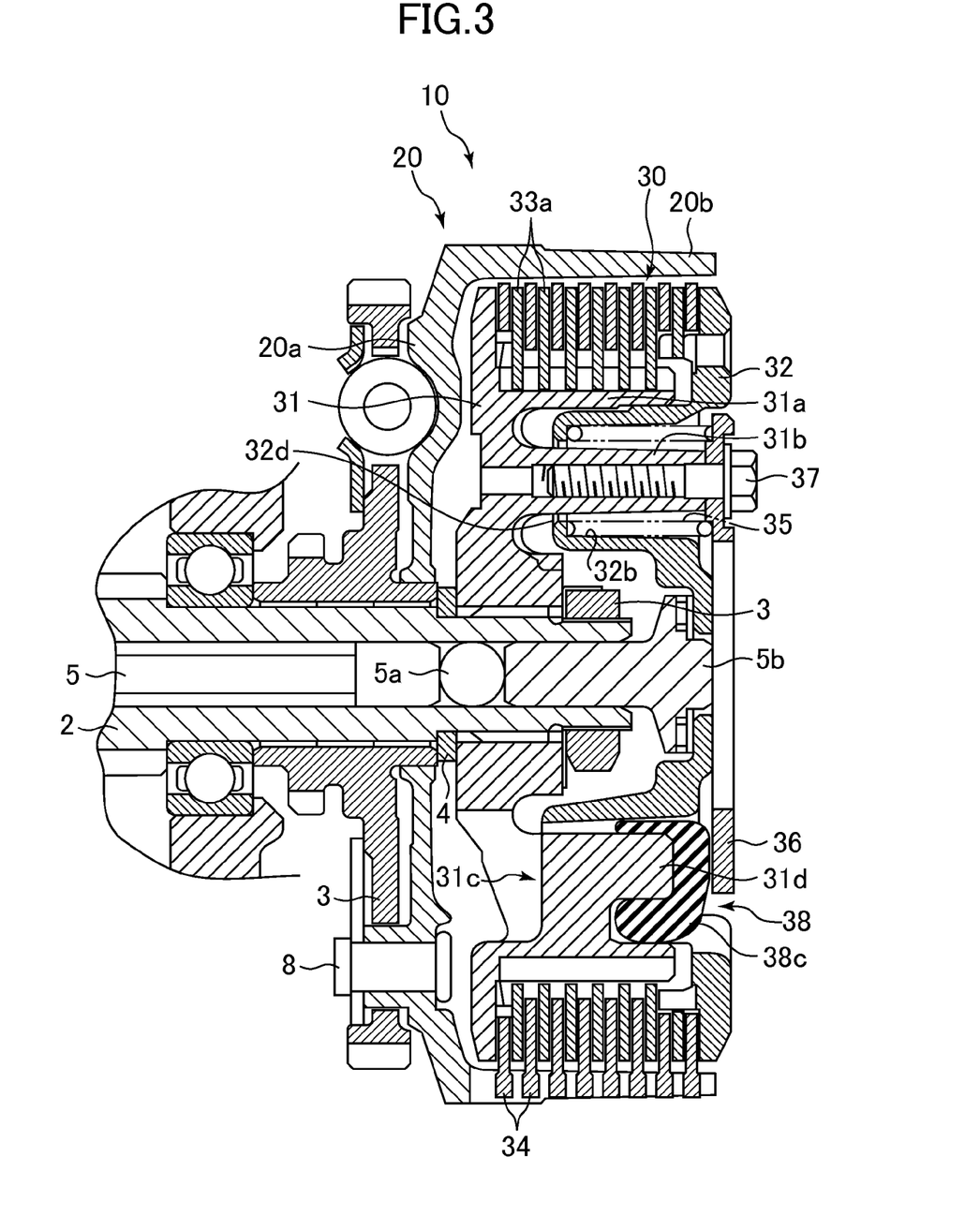
FIG. 3 is a sectional view of the clutch shown along the line III-III in FIG. 2.
Figure 4:
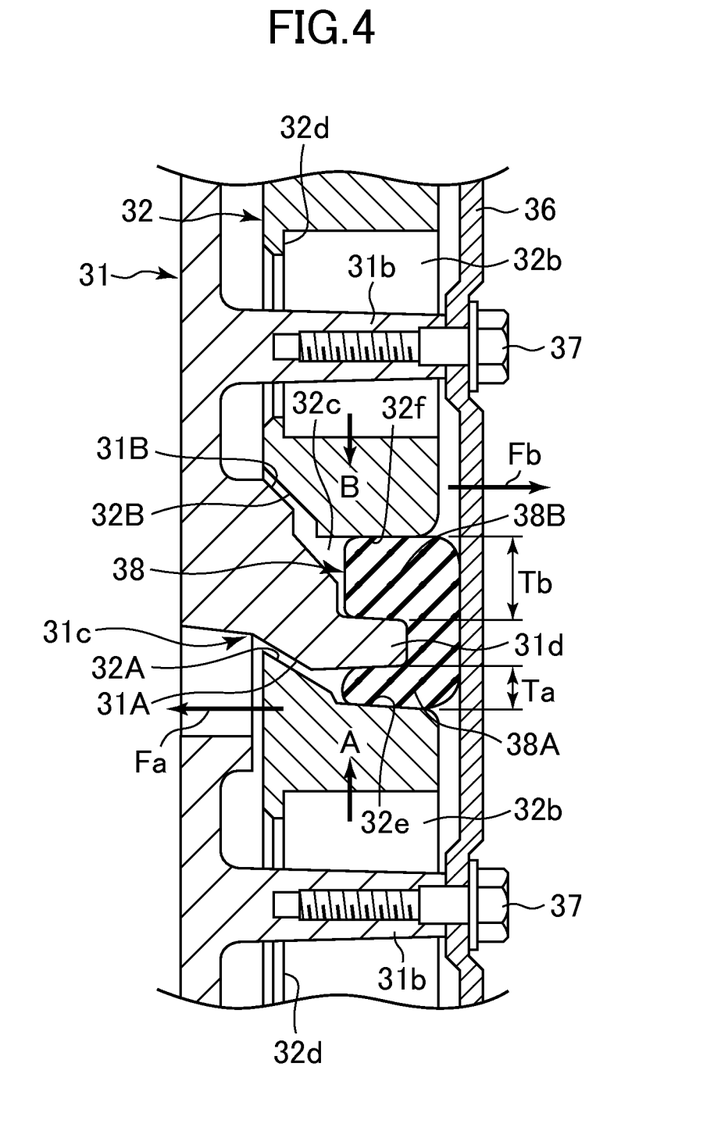
FIG. 4 is a sectional view along the line IV-IV in FIG. 2.

Preferred embodiments of the present invention will be explained with reference to the drawings. FIG. 1 is a side view of a straddle-type vehicle 1 including a friction clutch 10 according to a preferred embodiment of the present invention. FIG. 2 is a side view of the clutch 10 (a view of the clutch 10 as seen in an axial direction). FIG. 3 is a sectional view along the line III-III shown in FIG. 2. FIG. 4 is a sectional view along the line IV-IV shown in FIG. 2. A stopper plate 36 shown in FIG. 3 is indicated in FIG. 2 by a dashed-two dotted line. Further, a clutch spring 35 shown in FIG. 3 is omitted in FIG. 4.

The straddle-type vehicle 1 in FIG. 1 preferably is, for example, an all terrain vehicle. The vehicle 1 includes a seat 51 that a rider straddles and sits on. A steering handle 52 is positioned forward from the seat 51. The steering handle 52 is connected to right and left front wheels 54 through a steering shaft 53 and a tie rod (not shown). An engine unit 55 is provided in a lower portion at a center of a vehicle body. Right and left rear wheels 56 are positioned rearward from the engine unit 55. The engine unit 55 includes an engine 55a, the clutch 10, and a transmission. The clutch 10 may be used not only in all terrain vehicles but also in motorcycles and other vehicles.

As shown in FIG. 3, the clutch 10 is provided on a rotation shaft 2. The rotation shaft 2 is preferably an input shaft of the transmission, for example. The rotation shaft 2 may be another shaft provided in a torque transmission path from the engine 55a to the rear wheels 56. The clutch 10 includes a clutch housing 20 and a clutch inner 30 provided inside of the clutch housing 20. The clutch housing 20 is relatively rotatable with respect to the rotation shaft 2. The clutch housing 20 includes a wall portion 20a which includes a hole at the center thereof through which the rotation shaft 2 passes, and a cylindrical outer peripheral portion 20b provided on the outer periphery of the wall portion 20a. The clutch inner 30 is provided inside of the outer peripheral portion 20b.

As shown in FIG. 3, a gear 3 is provided on the rotation shaft 2. The gear 3 meshes with a gear provided on a crank shaft of the engine 55a, for example. The gear 3 is relatively rotatable with respect to the rotation shaft 2. The gear 3 and the wall portion 20a of the clutch housing 20 are preferably connected by a rivet 8, for example, and integrally rotate with each other.

The clutch inner 30 includes a clutch boss 31 (first member), a pressure member (second member) 32, and the clutch spring 35. The rotation shaft 2 is inserted through the center of the clutch boss 31. The clutch boss 31 is in spline engagement with the rotation shaft 2. Accordingly, the clutch boss 31 rotates integrally with the rotation shaft 2. The position of the clutch boss 31 in the axial direction is fixed preferably by a nut 3, for example, attached to an end portion of the rotation shaft 2 and a plate 4 fitted in the rotation shaft 2.

The clutch boss 31 and the pressure member 32 are opposed to each other in the axial direction of the rotation shaft 2. A plurality of clutch plates 33 and a plurality of friction plates 34 are alternately arranged between the clutch boss 31 and the pressure member 32. A plurality of projections projecting in a radial direction of the rotation shaft 2 are provided on the friction plate 34. The projections are fitted in grooves which are provided in the outer peripheral portion 20b of the clutch housing 20 and extend in the axial direction. Thus, the friction plates 34 integrally rotate with the clutch housing 20 and are movable in the axial direction. Further, the friction plates 34 are relatively rotatable with respect to the clutch boss 31 and the pressure member 32. The clutch boss 31 includes a cylindrical portion 31a located inside of the clutch plates 33 and the friction plates 34. A plurality of projections are provided on the inner periphery of the clutch plate 33. The projections are fitted in grooves which are provided in the cylindrical portion 31a and extend in the axial direction. Thus, the clutch plates 33 integrally rotate with the clutch boss 31. The clutch plates 33 are relatively rotatable with respect to the friction plates 34.

The pressure member 32 is relatively movable with respect to the clutch boss 31 in the axial direction of the rotation shaft 2. The clutch spring 35 presses the pressure member 32 toward the clutch boss 31 in the axial direction of the rotation shaft 2. Thus, the clutch plates 33 are pressed against the friction plates 34 by the pressure member 32. Then, the clutch plates 33, the pressure member 32, and the clutch boss 31 engage with the friction plates 34 by the friction between the clutch plates 33 and the friction plates 34.

The clutch 10 in the present preferred embodiment includes a stopper plate 36 (third member) arranged opposite to the clutch boss across the pressure member 32. The stopper plate 36 is preferably an annular or substantially annular member surrounding the axis of the rotation shaft 2. The clutch boss 31 includes a plurality of (preferably three in the example of FIG. 2) attachment bosses 31b extending in the axial direction toward the stopper plate 36. The pressure member 32 includes a hole 32b in a position corresponding to each attachment boss 31b. The attachment boss 31b extends through the hole 32b to the stopper plate 36. The stopper plate 36 is fixed to ends of the attachment bosses 31b by a bolt 37, for example. The hole 32b of the pressure member 32 includes a spring receiving portion 32d protruding toward the inside of the hole 32b in the end portion facing the stopper plate 36. The clutch spring 35 is preferably a coil spring and surrounds the attachment bosses 31b. Further, the clutch spring 35 is sandwiched between the stopper plate 36 and the spring receiving portion 32d to press them apart from each other. Thus, the pressure member 32 is pressed toward the clutch boss 31 in the axial direction. The hole 32b preferably has an oval or substantially oval shape extending in the rotation direction. Thus, the movement of the attachment bosses 31b in the rotation direction is allowed inside of the hole 32b. As a result, the relative position of the clutch boss 31 and the pressure member 32 may change in the rotation direction of the rotation shaft 2 as will be described below in detail.

The rotation shaft 2 in the preferred embodiment shown in FIG. 3 is preferably cylindrical or substantially cylindrical. A push rod 5 movable in the axial direction is provided at the center of the rotation shaft 2. The push rod 5 moves in the axial direction according to an operation by a rider and actuation of an actuator. The push rod 5 presses the pressure member 32 against the force of the clutch spring 35, and thus, the pressure member 32 moves in a direction away from the clutch boss 31 and the clutch 10 shifts from an engagement state to a non-engagement state. In the preferred embodiment shown in FIG. 3, a ball 5a and a pressing member 5b are provided between the end of the push rod 5 and the pressure member 32. The stopper plate 36 restricts the maximum of the distance of the pressure member 32 from the clutch boss 31. That is, the pressure member 32 comes into contact with the stopper plate 36 and the movement in the direction away from the clutch boss 31 is limited.

The relative position of the clutch boss 31 and the pressure member 32 changes in the rotation direction of the rotation shaft 2. As shown in FIG. 4, the clutch boss 31 and the pressure member 32 include a cam surface 31A and a cam surface 32A, respectively. The clutch boss 31 and the pressure member 32 in the present preferred embodiment further include a cam surface 31B and a cam surface 32B, respectively. The cam surface 31A and the cam surface 32A come into contact with each other when the position of the pressure member 32 changes in a first direction (A-direction in FIG. 4) with respect to the clutch boss 31. The cam surface 31B and the cam surface 32B come into contact with each other when the position of the pressure member 32 changes in a second direction (B-direction in FIG. 4) with respect to the clutch boss 31. The first direction A is a rotation direction of the clutch 10 when the engine 55a is driven and the second direction B is a direction opposite to the first direction A.

As shown in FIG. 4, the clutch boss 31 includes a plurality of cam portions 31c extending in the axial direction toward the pressure member 32. Each cam portion 31c includes the cam surfaces 31A, 31B on the outer surface thereof. The cam surfaces 31A, 31B are located at opposite sides to each other in the rotation direction. The clutch boss 31 in the present preferred embodiment preferably includes the three cam portions 31c, for example. The three cam portions 31c are spaced apart from one another in the rotation direction and surround the rotation shaft 2. The plurality of cam portions 31c are generally located on the same circumference as the attachment bosses 31b and alternately arranged with the attachment bosses 31b. The pressure member 32 includes a plurality of holes 32c provided therein in which the cam portions 31c are to be respectively fitted (hereinafter, the holes will be referred to as "cam holes"). Each cam hole 32c includes the cam surfaces 32A, 32B on the inner surface thereof.

The clutch boss 31 is in spline engagement with the rotation shaft 2. Thus the clutch boss 31 is slower to follow the rotation of the clutch housing 20 than the pressure member 32 is. Therefore, when the torque input from the engine 55a rapidly increases and then the rotation speed of the clutch housing 20 rotating in the first direction A increases, the position of the pressure member 32 shifts in the first direction A with respect to the position of the clutch boss 31. As a result, the cam surface 32A of the pressure member 32 comes into contact with the cam surface 31A of the clutch boss 31. The cam surfaces 31A, 32A tilt with respect to the rotation direction of the rotation shaft 2 such that a force Fa is generated in the axial direction between the clutch boss 31 and the pressure member 32 when the cam surfaces 31A, 32A come into contact with each other. The force Fa presses the pressure member 32 toward the clutch boss 31, and assists the pressure force applied to the pressure member 32 by the clutch spring 35.

When the torque input from the engine 55a decreases and then the rotation speed of the clutch housing 20 rotating in the second direction B decreases, or when a disturbance acts on the rear wheels 56 and thus the rotation speed of the rotation shaft 2 rapidly increases, the position of the pressure member 32 shifts in the second direction B with respect to the position of the clutch boss 31. In this regard, the cam surface 32B of the pressure member 32 comes into contact with the cam surface 31B of the clutch boss 31. The cam surfaces 31B, 32B tilt with respect to the rotation direction of the rotation shaft 2 such that a force Fb in the axial direction is generated between the clutch boss 31 and the pressure member 32 when the cam surfaces 31B, 32B come into contact with each other. The force Fb separates the pressure member 32 from the clutch boss 31, and reduces the pressure force applied to the pressure member 32 by the clutch spring 35.

As shown in FIG. 4, the clutch 10 includes a first damper member 38A to damp the collision between the cam surface 31A and the cam surface 32A caused when the relative position of the clutch boss 31 and the pressure member 32 changes. Further, the clutch 10 includes a second damper member 38B to damp the collision between the cam surface 31B and the cam surface 32B caused when the relative position of the clutch boss 31 and the pressure member 32 changes. In the present preferred embodiment, the first damper member 38A and the second damper member 38B are preferably integrally molded (hereinafter, the integrally molded member will be referred to as "damper 38"), for example. The damper 38 is preferably molded using a resin such as rubber, for example. The first damper member 38A and the second damper member 38B may not necessarily be integrally molded. Further, the second damper member 38B may not necessarily be provided.

The distance between the cam surfaces 32A, 32B of the pressure member 32 is larger than the distance between the cam surfaces 31A, 31B (that is, the thickness of the cam portion 31c) of the clutch boss 31. Accordingly, when the torque input from the engine 55a does not vary or any disturbance does not act on the rear wheels 56, clearances exist between the cam surfaces 31A, 32A and between the cam surfaces 31B, 32B. The cam surfaces 31A, 32A come into contact with each other when the first damper member 38A contracts in the rotation direction of the rotation shaft 2. In other words, a thickness Ta (FIG. 4) of the first damper member 38A in the rotation direction is set so that the cam surfaces 31A, 32A do not come into contact with each other until the first damper member 38A contracts by a predetermined dimension. Thus, the collision between the cam surfaces 31A, 32A is damped or prevented. Similarly, a thickness Tb (FIG. 4) of the second damper member 38B in the rotation direction is set so that the cam surfaces 31B, 32B do not come into contact with each other until the second damper member 38B contracts by a predetermined dimension. Thus, the collision between the cam surfaces 31B, 32B is damped or prevented. The thickness Ta of the first damper member 38A is preferably set so that the first damper member 38A separates from the inner surface of the cam hole 32c when the cam surfaces 31B, 32B are in contact with each other. Alternatively, the thickness Ta of the first damper member 38A may be set so that the first damper member 38A comes into contact with the inner surface of the cam hole 32c when the cam surfaces 31B, 32B are in contact with each other. Similarly, the thickness Tb of the second damper member 38B is preferably set so that the second damper member 38B separates from the inner surface of the cam hole 32c when the cam surfaces 31A, 32A are in contact with each other. Alternatively, the thickness Tb of the second damper member 38B may be set so that the second damper member 38B comes into contact with the inner surface of the cam hole 32c when the cam surfaces 31A, 32A are in contact with each other.

The first damper member 38A is provided in a position different from those of the cam surfaces 31A, 32A. That is, the first damper member 38A is not sandwiched between the cam surfaces 31A, 32A, and thus the cam surfaces 31A, 32A directly come into contact with each other. Accordingly, an excessive load is prevented from acting on the first damper member 38A and the durability of the first damper member 38A is improved. Similarly, the second damper member 38B is provided in a position different from those of the cam surfaces 31B, 32B. That is, the second damper member 38B is not sandwiched between the cam surfaces 31B, 32B, and thus the cam surfaces 31B, 32B directly come into contact with each other. As a result, an excessive load is prevented from acting on the second damper member 38B and the durability of the second damper member 38B is improved.

In the present preferred embodiment, the damper 38 is provided inside of the cam hole 32c and the first damper member 38A is spaced apart from the positions of the cam surfaces 31A, 32A in the axial direction. Accordingly, it is not necessary to increase the distance between the cam surface 31A and the cam surface 32A to accommodate the first damper member 38A. Similarly, the second damper member 38B is spaced apart from the positions of the cam surfaces 31B, 32B in the axial direction. Accordingly, it is not necessary to increase the distance between the cam surface 31B and the cam surface 32B to accommodate the second damper member 38B. As a result, it is not necessary to increase the diameters of the pressure member 32 and the clutch boss 31. Further, it is not necessary to reduce the number of cam portions 31c and the number of cam holes 32c.

In the present preferred embodiment, the cam portion 31c of the clutch boss 31 includes the cam surfaces 31A, 31B in the base portion thereof. The cam portion 31c includes an end portion 31d extending from the portion in which the cam surfaces 31A, 31B are located (the base portion) in the axial direction. The inner surface of the cam hole 32c of the pressure member 32 includes damper receiving surfaces 32e, 32f facing each other in the rotation direction. The end portion 31d is located between the damper receiving surfaces 32e, 32f. The first damper member 38A is located between the end portion 31d and the damper receiving surface 32e. The second damper member 38B is located between the end portion 31d and the damper receiving surface 32f.

As described above, the first damper member 38A and the second damper member 38B preferably are integrally molded to define the damper 38. The end portion 31d of the cam portion 31c is fitted in the hole in the damper 38. Thus, the damper 38 is easily attached to the end portion 31d. The first damper member 38A and the second damper member 38B are located at opposite sides to each other across the end portion 31d. The method of attaching the damper 38 is not limited to that described above. For example, in the case where the first damper member 38A and the second damper member 38B are separate elements, the first damper member 38A is preferably bonded to the end portion 31d or the damper receiving surface 32e. Further, the second damper member 38B may be bonded to the end portion 31d or the damper receiving surface 32f, for example.

As shown in FIG. 4, the end portion 31d of the cam portion 31c has a smaller thickness in the rotation direction of the rotation shaft 2 than that of the base portion in which the cam surfaces 31A, 31B are provided. Accordingly, the thicknesses Ta, Tb of the damper members 38A, 38B in the rotation direction are easily secured.

As described above, the cam surfaces 31A, 32A, 31B, 32B tilt with respect to the rotation direction of the rotation shaft 2. The angles of the damper receiving surfaces 32e, 32f with respect to the rotation direction are larger than the angles of the cam surfaces 31A, 32A, 31B, 32B with respect to the rotation direction. In the example of FIG. 4, the damper receiving surfaces 32e, 32f are perpendicular or substantially perpendicular to the rotation direction. Further, the end portion 31d of the cam portion 31c is also perpendicular or generally perpendicular to the rotation direction. Accordingly, stress in the axial direction is significantly reduced or prevented inside of the damper members 38A, 38B, and the durability of the damper members 38A, 38B is improved. The base portion of the cam portion 31c in which the cam surfaces 31A, 31B are provided extends obliquely with respect to the rotation direction of the rotation shaft 2. The end portion 31d bends with respect to the base portion of the cam portion 31c, extends in a direction along the axial direction of the rotation shaft 2, and is perpendicular or substantially perpendicular to the rotation direction.

As shown in FIG. 4, the cam hole 32c penetrates the pressure member 32 in the axial direction. The stopper plate 36 is provided at the opposite side to the clutch boss 31 across the pressure member 32. The stopper plate 36 is located on the extension of the cam portion 31c. The damper 38 is sandwiched by the end portion 31d of the cam portion 31c and the stopper plate 36 in the axial direction. Thus, the attachment stability of the damper 38 to the end portion 31d is secured. The stopper plate 36 preferably presses the damper 38 toward the end portion 31d. Since the stopper plate 36 is fixed to the attachment boss 31b, the distance between the stopper plate 36 and the end portion 31d of the cam portion 31c is constant regardless of the position of the pressure member 32 in the axial direction. Therefore, the state that the damper 38 is sandwiched by them is maintained regardless of the position of the pressure member 32 in the axial direction.

As shown in FIG. 3, a portion of the damper 38 protrudes from the stopper plate 36 in the radial direction of the rotation shaft. In the present preferred embodiment, an outer portion 38c of the damper 38 protrudes from the outer peripheral edge of the stopper plate 36. Due to this protrusion, elastic deformation of the damper 38 becomes easier, and an excessive load does not act on the damper 38. That is, when the damper members 38A, 38B contract, the outer portion 38c of the damper 38 may slightly protrude in the axial direction over the outer peripheral edge of the stopper plate 36. The outer portion 38c of the damper 38 does not necessarily protrude from the outer peripheral edge of the stopper plate 36.

As shown in FIG. 2, a width W1 of the cam hole 32c in the radial direction is larger than a width W2 of the damper 38. Accordingly, the outer portion 38c of the damper 38 is exposed between an edge 32g of the cam hole 32c and the outer peripheral edge of the stopper plate 36. Also, due to this exposure, elastic deformation of the damper 38 becomes easier.

When the torque of the engine 55a rapidly increases in the state in which the clutch 10 is engaged only by the pressure force of the clutch spring 35, the relative position of the pressure member 32 with respect to the clutch boss 31 slightly changes in the first direction A. Suppose that the amount of change in this regard is Ra. In contrast, when the torque of the engine 55a decreases or the rotation speed of the rotation shaft 2 rapidly decreases, the relative position of the pressure member 32 with respect to the clutch boss 31 changes in the second direction B. Suppose that the amount of change in this regard is Rb. When the torque of the engine 55a decreases or the rotation speed of the rotation shaft 2 rapidly increases, the pressure member 32 may move into contact with the stopper plate 36. Accordingly, the amount of change Rb is larger than the amount of change Ra. That is, the amount of compression of the second damper member 38B is larger than the amount of compression of the first damper member 38A. A larger volume is preferably provided for the second damper member 38B than that of the first damper member 38A. Thus, the durability of the second damper member 38B is secured. In the example of FIG. 4, the dimension (thickness Tb) of the second damper member 38B in the rotation direction of the rotation shaft 2 is larger than the dimension (thickness Ta) of the first damper member 38A in the rotation direction of the rotation shaft 2.

As described above, the damper members 38A, 38B are provided in the clutch 10. The first damper member 38A damps the collision between the cam surfaces 31A, 32A when the relative position of the clutch boss 31 and the pressure member 32 changes in the rotation direction. Thus, the generation of noise when the cam surfaces 31A, 32A collide with each other is significantly reduced or prevented. Further, the second damper member 38B damps the collision between the cam surfaces 31B, 32B when the relative position of the clutch boss 31 and the pressure member 32 changes in the rotation direction. Thus, the generation of noise when the cam surfaces 31B, 32B collide with each other is significantly reduced or prevented.

The preferred embodiments of the present invention are not limited to the above described clutch 10, and various changes may be made within the scope of the present invention.

For example, the cam hole 32c does not necessarily penetrate the pressure member 32.

Further, the clutch boss 31 and the pressure member 32 do not necessarily include the cam surfaces 31B, 32B, respectively.

The position of the damper 38 is not limited to that in the cam hole 32c.

A cam portion projecting toward the clutch boss 31 may be provided in the pressure member 32 and a hole in which the cam portion is fitted may be provided in the clutch boss 31.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A friction clutch comprising:
   a first member and a second member opposed to each other in an axial direction of a rotation shaft, the first member and the second member configured to be relatively movable in the axial direction of the rotation shaft and to change in a relative position in a rotation direction thereof;
   a friction plate provided between the first member and the second member and configured to be relatively rotatable with respect to the first member and the second member;
   a spring configured to press one of the first member and the second member toward the other of the first member and the second member in the axial direction of the rotation shaft to engage the first member and the second member with the friction plate;
   a first cam portion and a second cam portion provided on the first member and the second member, respectively, and configured to come into contact with each other such that a force in the axial direction of the rotation shaft is generated between the first member and the second member when the relative position of the first member and the second member changes in the rotation direction; and
   a damper member configured to damp a collision between the first cam portion and the second cam portion when the relative position of the first member and the second member changes in the rotation direction; wherein
   the first cam portion and the second cam portion are not in contact with each other until the damper member contracts by a predetermined dimension, and directly come into contact with each other when the damper member contracts by the predetermined dimension; and
   a position of the damper member is shifted in the axial direction from positions of the first cam portion and the second cam portion.

2. The friction clutch according to claim 1, wherein the first member includes a cam portion projecting in the axial direction and including the first cam portion therein, and the cam portion is fitted in a hole in the damper member.

3. The friction clutch according to claim 1, wherein the first member includes a cam portion projecting in the axial direction and including the first cam portion therein;
   the second cam portion is an inner surface of a hole in the second member in which the cam portion is fitted; and
   the damper member is provided inside of the hole.

4. The friction clutch according to claim 3, wherein the hole in the second member penetrates the second member in the axial direction;
- a third member is arranged opposite to the first member across the second member and fixed to the first member; and
- the damper member is positioned inside the hole of the second member and sandwiched between the first member and the third member in the axial direction of the rotation shaft.

5. A straddle-type vehicle including the friction clutch according to claim 1.

6. A friction clutch comprising:
- a first member and a second member opposed to each other in an axial direction of a rotation shaft, the first member and the second member configured to be relatively movable in the axial direction of the rotation shaft and to change in a relative position in a rotation direction thereof;
- a friction plate provided between the first member and the second member and configured to be relatively rotatable with respect to the first member and the second member;
- a spring configured to press one of the first member and the second member toward the other of the first member and the second member in the axial direction of the rotation shaft to engage the first member and the second member with the friction plate;
- a first cam portion and a second cam portion provided on the first member and the second member, respectively, and configured to generate a force to press one of the first member and the second member toward the other of the first member and the second member in the axial direction of the rotation shaft when the first cam portion and the second cam portion come into contact with each other by a change of the relative position between the first member and the second member;
- a third cam portion and a fourth cam portion provided on the first member and the second member, respectively, and configured to generate a force to separate one of the first member and the second member from the other of the first member and the second member in the axial direction of the rotation shaft when the third cam portion and the fourth cam portion come into contact with each other by a change of the relative position between the first member and the second member;
- a first damper member configured to damp the collision between the first cam portion and the second cam portion; and
- a second damper member configured to damp a collision between the third cam portion and the fourth cam portion.

7. The friction clutch according to claim 6, wherein a dimension of the second damper member in the rotation direction of the rotation shaft is larger than a dimension of the first damper member in the rotation direction of the rotation shaft.

8. The friction clutch according to claim 7, wherein a volume of the second damper member is larger than a volume of the first damper member.

9. The friction clutch according to claim 6, wherein the first damper member and the second damper member are integral with each other.

* * * * *